US008087138B2

(12) United States Patent
Gupta

(10) Patent No.: US 8,087,138 B2
(45) Date of Patent: Jan. 3, 2012

(54) BEAD CRIMPING TOOL

(76) Inventor: Nikhil Gupta, Schaumburg, IL (US)

( * ) Notice: Subject to any disclaimer, the term of this patent is extended or adjusted under 35 U.S.C. 154(b) by 529 days.

(21) Appl. No.: 12/322,890

(22) Filed: Feb. 9, 2009

(65) Prior Publication Data

US 2009/0235510 A1 Sep. 24, 2009

Related U.S. Application Data

(60) Provisional application No. 61/063,954, filed on Feb. 7, 2008.

(51) Int. Cl.

| | |
|---|---|
| ***B25B 27/00*** | (2006.01) |
| ***B25B 27/14*** | (2006.01) |
| ***B25B 1/00*** | (2006.01) |
| ***B25B 1/04*** | (2006.01) |
| ***B23P 19/04*** | (2006.01) |
| ***B23Q 1/00*** | (2006.01) |

(52) U.S. Cl. .................. 29/270; 269/6; 269/3; 269/278; 29/253; 29/257; 29/268; 29/278; 29/281.5; 29/283.5

(58) Field of Classification Search .................... 29/270, 29/253, 257, 261, 268, 276, 278, 281.5, 283.5; 269/6, 3, 91, 95

See application file for complete search history.

(56) References Cited

U.S. PATENT DOCUMENTS

| | | | | |
|---|---|---|---|---|
| 2,503,783 | A * | 4/1950 | Ward et al. | 81/367 |
| 3,170,345 | A * | 2/1965 | Poingt | 72/409.12 |
| 3,259,966 | A * | 7/1966 | Canter | 29/282 |
| 3,393,438 | A * | 7/1968 | Marley et al. | 29/566.4 |
| 3,659,397 | A * | 5/1972 | Mills | 53/329 |
| 3,665,924 | A * | 5/1972 | Noiles et al. | 606/143 |
| 3,740,994 | A * | 6/1973 | De Carlo, Jr. | 72/407 |
| 4,070,745 | A * | 1/1978 | Schimmelman | 29/268 |
| 4,219,919 | A * | 9/1980 | Fischbein et al. | 29/270 |
| 4,286,372 | A * | 9/1981 | Batcheller | 29/516 |
| 4,306,345 | A * | 12/1981 | Dearman | 29/272 |
| 4,403,497 | A * | 9/1983 | Matteucci | 72/409.16 |
| 4,483,059 | A * | 11/1984 | Dearman | 29/272 |
| 4,637,084 | A * | 1/1987 | Wood | 7/134 |
| 4,769,891 | A * | 9/1988 | Corral | 29/268 |
| 4,776,079 | A * | 10/1988 | Cameron | 29/268 |
| 4,953,384 | A * | 9/1990 | Baillet et al. | 72/409.06 |
| 5,007,312 | A * | 4/1991 | Bailey | 81/426.5 |

(Continued)

FOREIGN PATENT DOCUMENTS

CH 657559 A * 9/1986

*Primary Examiner* — Alvin Grant

(74) *Attorney, Agent, or Firm* — Polster, Lieder, Woodruff & Lucchesi, L.C.

(57) ABSTRACT

A bead crimping tool for crimping a bead element and method for use, wherein the tool includes a base handle, a crush plate member, a pair of opposed pincer members, an actuator handle, and a crush arm member. The bead element is placed on the crush plate and preferably secured in place by the crush arm. Crimping the bead includes squeezing of the actuator handle. During a first portion of such actuation, a cam portion of the actuator handle cases the pincer members to impart a lateral compressive force to a lateral portion of the bead element sufficient to collapse the bead element in a lateral direction. During a subsequent second portion of the single actuation cycle, the crush arm is caused to impart a longitudinal compressive force about a top portion of the bead element sufficient to compress the collapsed bead element in a longitudinal direction.

14 Claims, 5 Drawing Sheets

U.S. PATENT DOCUMENTS

| | | | | | |
|---|---|---|---|---|---|
| 5,307,565 | A | * | 5/1994 | Erbrick et al. | 30/251 |
| D356,520 | S | | 3/1995 | Bartky | |
| 5,426,843 | A | | 6/1995 | Bartky | |
| D366,199 | S | | 1/1996 | Bartky | |
| 5,680,788 | A | * | 10/1997 | Kootte | 72/452.8 |
| 5,870,925 | A | * | 2/1999 | Morris et al. | 72/409.12 |
| 5,871,488 | A | * | 2/1999 | Tovey et al. | 606/139 |
| 5,895,035 | A | * | 4/1999 | Bley | 269/6 |
| 5,913,933 | A | * | 6/1999 | Beetz et al. | 72/409.16 |
| 5,991,997 | A | * | 11/1999 | Schley et al. | 29/426.5 |
| 6,164,107 | A | * | 12/2000 | Korba, Jr. | 72/31.1 |
| 6,286,358 | B1 | * | 9/2001 | Beetz et al. | 72/409.12 |
| 6,672,128 | B2 | * | 1/2004 | Wagner et al. | 72/393 |
| 7,886,570 | B2 | * | 2/2011 | Cleland et al. | 72/409.1 |
| 2011/0131780 | A1 | * | 6/2011 | Weaver | 29/270 |

* cited by examiner

BEAD CRIMPING TOOL

CROSS-REFERENCE TO RELATED APPLICATION

This application claims priority to provisional patent application Ser. No. 61/063,954 filed on Feb. 7, 2008 entitled “Bead Crimping Tool”

TECHNICAL FIELD OF THE INVENTION

The present invention relates generally to tools for making jewelry. In particular, the present invention relates to tools for crimping bead elements, such as beads, ferrules or tubes onto wires.

BACKGROUND OF THE INVENTION

Decorative beads are frequently used in the art of jewelry making. Beads are strung on wire or other types of filament or line in order to form an aesthetically pleasing configuration.

In order to keep beads or other threaded objects in place, a technique known as crimping is used to secure beading wire. Crimping involves the crushing of a beading element, such as a malleable bead, ferrule, or tube, typically made of a malleable material such as metal, onto the wire to hold the wire in place. In an illustrative example, a wire is doubled over to form a closed loop. A malleable bead is slipped over the doubled over wire. In order to secure and hold the loop formed by the wire, the bead is crimped by a tool, such as a chain nose plier. This flattens the bead to squeeze the wire, holding it in place. This process produces a functional but unattractive bead.

Existing crimping tools perform this process by using a pair of pliers with a kidney shaped aperture or groove. The resulting crimped bead takes on the kidney shape of the aperture. As this is generally unattractive and displeasing from an aesthetic and design standpoint, the tool typically also contains a round aperture. The crimped bead is then moved to the round aperture where it is compressed again to form a more uniformly round shape.

Existing crimping tools require that the bead be first crimped in a kidney shaped aperture and repositioned to a round shaped aperture. Since the initial crimping step flattens the bead into an elongated oval, the crimped bead is usually rotated 90 degrees by the user and then compressed along the major axis of the generally elliptical crimped bead. This second compression results in a generally rounded final result. This two step process requiring the user to reset the partially crimped bead is undesirable and is potentially difficult due to the small size of the items involved. Moreover, the proper positioning of the bead element is difficult.

There is thus a need for a convenient tool that can accomplish what normally is a two step crimping process involving two separate crushing steps with the pliers in a single motion without the need to reposition the bead element.

SUMMARY OF THE INVENTION

The present invention is directed to a bead crimping tool and method for crimping a bead element, such as a ferrule, tube or bead. In a preferred embodiment, the bead crimping tool includes a base handle, a crush plate member, a pair of opposed pincer members, an actuator handle, and a crush arm member. The crush plate member is preferably integrally formed with the base handle and is provided with a concave seat. The pair of opposed pincer members are positioned on opposite sides of the crush plate member and are preferably pivotally mounted to the base handle. The actuator handle member is also preferably pivotally mounted to the base handle. The actuator handle member may comprise a cam portion that engages the pincer member. The actuator handle may also include an actuator portion and a lever arm portion. The crush arm member is also preferably pivotally mounted to the base handle and defines a head portion and a tail portion. It is preferred that the head of the crush member defines a concave portion that, in cooperation with the concave portion of the base handle seat, holds the bead element. In some embodiments, the crush arm member may be biased, such as by a spring member, so as to provide a holding force on the bead element seated on the crush plate member. By providing the crush arm member, the user is not required to manually hold the bead element in place during the crimping cycle, which often leads to the accidental pinching of the user’s fingers.

In order to crimp a bead element, the bead element is placed on the crush plate and preferably secured in place by the crush arm. During the operation of the actuating cycle, i.e., the act of crimping a bead element, squeezing of the actuator handle by the user first causes the cam portion of the actuator handle to pivot the at least one pivotally mounted pincer member. This pivoting of the pincer member causes the pincer member to impart a lateral compressive force to a lateral portion of the bead element. For example, the pincer member may exert a force on the bead element about the equator of the bead element. This lateral compressive force sufficient to collapse the bead element in a lateral direction. For example, when both pincer members are pivoted, the equator of the bead element is collapsed inward such that it defines a substantially figure eight cross section. During this single actuating cycle, the user continues to squeeze the actuator handle so as to cause the lever arm portion to engage a tail portion of the crush arm member and thereby urge a head portion of the crush arm to impart a longitudinal compressive force about a top portion of the bead element. This longitudinal compressive force is sufficient to compress the collapsed bead element in a longitudinal direction.

After the bead element is crimped, the bead element is removed from the tool. In some embodiments, releasing the actuator handle enables a spring to reset the tool to an initial starting position for a new actuating cycle, i.e., crimping of a subsequent bead element.

These and other objectives, features and advantages of the present invention will be understood upon consideration of the following detailed description of the invention and the accompanying drawings.

DESCRIPTION OF THE PREFERRED EMBODIMENTS

A preferred embodiment of the present invention will now be described. The crimper tool preferably is capable of exerting a lateral compressive force on a bead element in a lateral direction to complete a first portion of a crimping procedure, and then during a continuous actuation cycle, exert a second compressive force on the bead element in a generally longitudinal direction to form an aesthetically pleasing end product. Unlike the prior art crimpers, the present invention is preferably capable of imparting the successive compressive forces without the need for repositioning or rotation of the bead element by the user. For ease of operation, it is also desirable that the tool perform these steps in response to a single user action.

Figure 1:
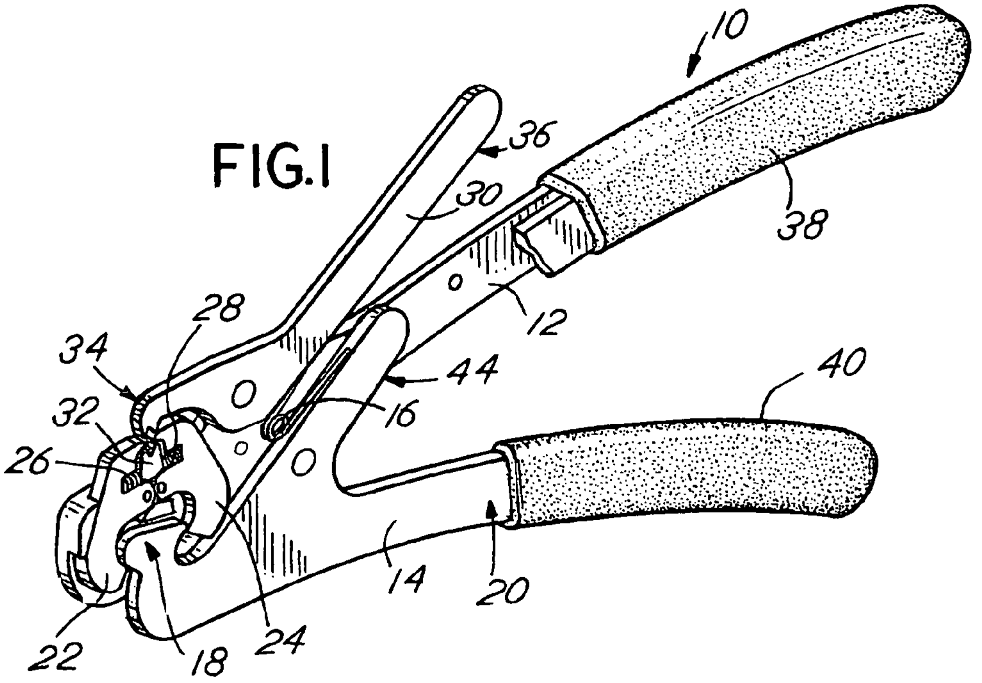
FIG. 1 is a perspective view of a preferred embodiment of the present invention.
Figure 2:
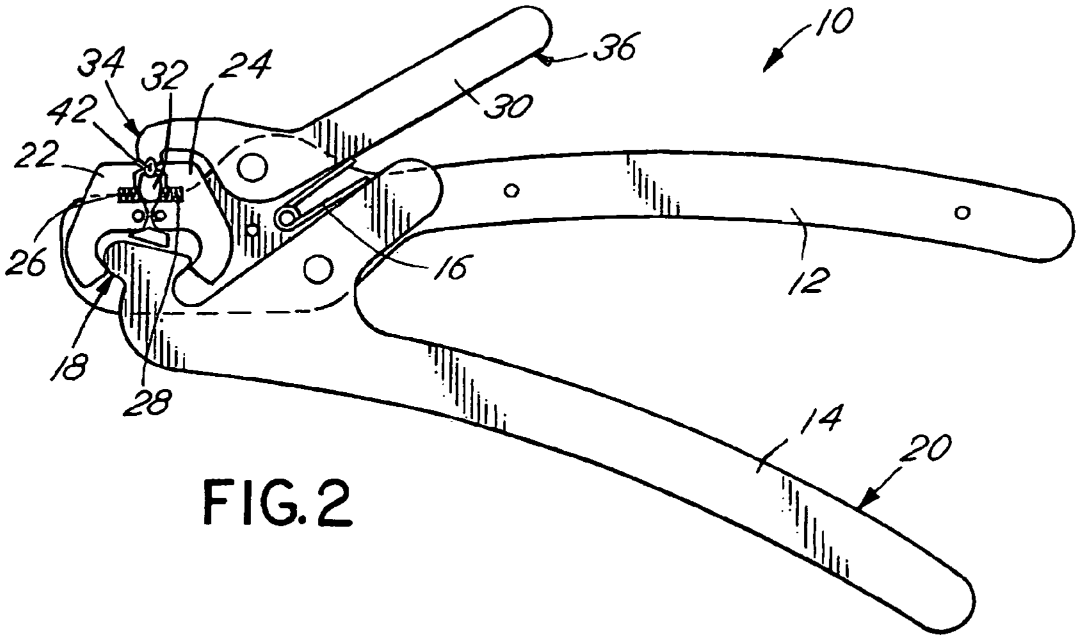
FIG. 2 is a side elevated view of the embodiment of FIG. 1.

A preferred embodiment of the invention is shown in FIGS. 1 and 2. The preferred embodiment of the crimper tool 10 contains a pair of handles, a base handle 12 and an actuator handle member 14, which are pivotably connected to one another together. The base handle 12 and actuator handle member 14 are preferably biased in an open position, such as by a spring member 16, and can be closed by a user squeezing the handles together. The actuator handle member preferably includes operative cam 18 and a lever arm portion 20. Cam 18 is operatively engageable with a pair of pincers members 22 and 24. FIG. 1 shows the handles 12 and 14 as including gripping members, such as sleeves 38 and 40 that provide cushioning and a more secure grip.

Pincers 22 and 24 may be pivotably connected to the base handle 12. The pincers 22 and 24 are biased open by a biasing mechanism such as spring members 26 and 28. The pincers 22 and 24 are capable of generating a compressive force on a bead held between the pincers, as will be discussed in further detail below. Cam 18 is preferably configured in a shape so as to activate the pair of pincers 22 and 24 to generate a lateral compressive force therebetween. It should be noted that the reference to a lateral compressive force is for ease of reference and does not limit the alignment of the tool 10 in use.

The crimper tool 10 also includes a crush arm 30 and a crush plate 32. Crush arm 30 is pivotably connected to the base handle 12 and is capable of exerting a longitudinal holding force on a bead when seated on the crush plate 32. As shown, the crush arm 30 defines a head portion 34 and a tail portion 36. The crush plate 32 and the head portion 34 each preferably define a concave portion for cupping the bead. In addition to the holding force, the crush plate 32, as will be discussed in further detail below, is also adapted to exert a longitudinal compressive force on a bead trapped between head portion 34 of crush arm 30 and crush plate 32. Crush plate 32 can be fixed to the base handle 12 by any method known in the art such as welding or mechanical attachment, or may be formed integrally by casting.

Figure 3:
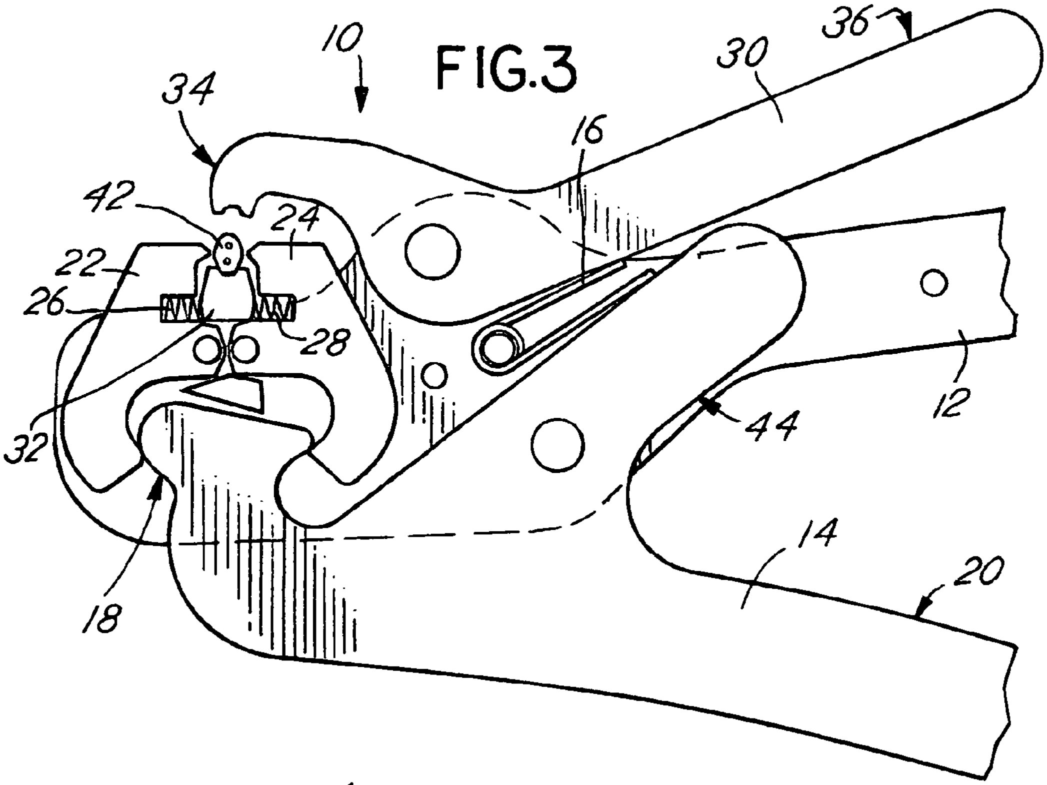
FIG. 3 is an enlarged view of the preferred embodiment of the present invention with a bead element being seated in the tool.
Figure 4:
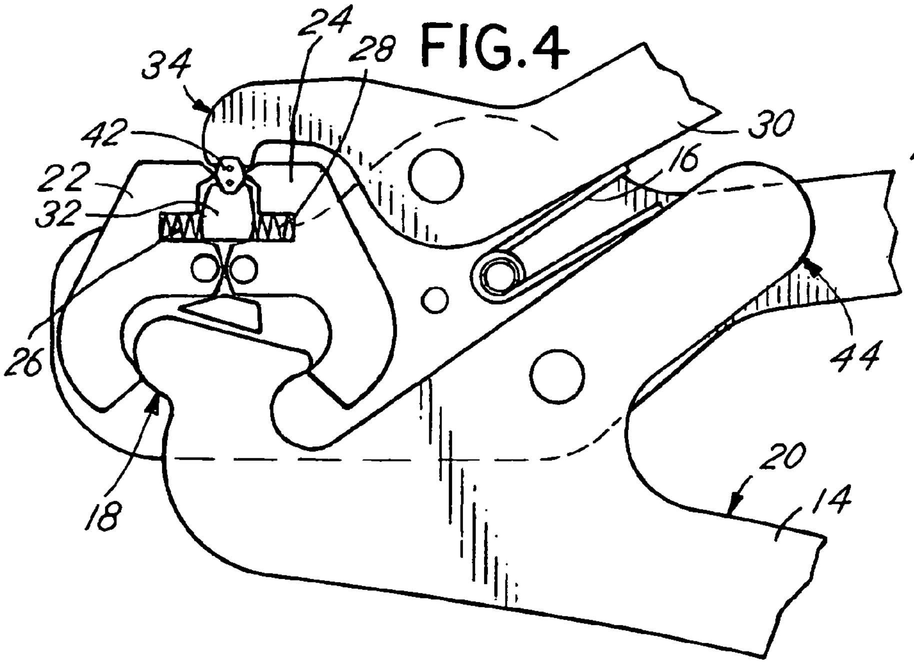
FIG. 4 is an enlarged view of the preferred embodiment of the present invention with the crush arm member securing the bead element in the tool.

A preferred method of operating the crimper tool 10 will now be described. Referring to FIG. 3, crush arm 30, which is biased by spring member 16 to exert a holding force on the bead element 42 is first moved by squeezing the tail portion 36 of the crush arm 30 to open space between the head portion 34 and the crush plate 32. A bead element, such as a ferrule, malleable tube or bead 42 is seated on the crush plate 32. Crush arm 30 is then allowed to swing back such that the head portion exerts the holding force on the bead, such as shown in FIG. 4.

Figure 5:
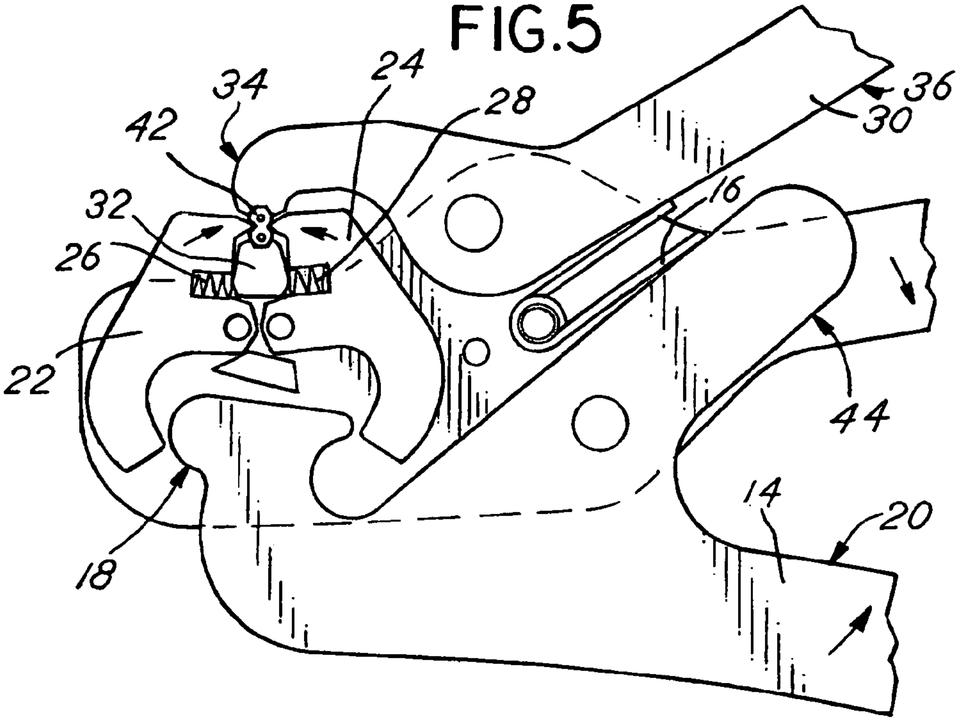
FIG. 5 is an enlarged view of the preferred embodiment of the present invention during a first portion of an actuation cycle.
Figure 5A:
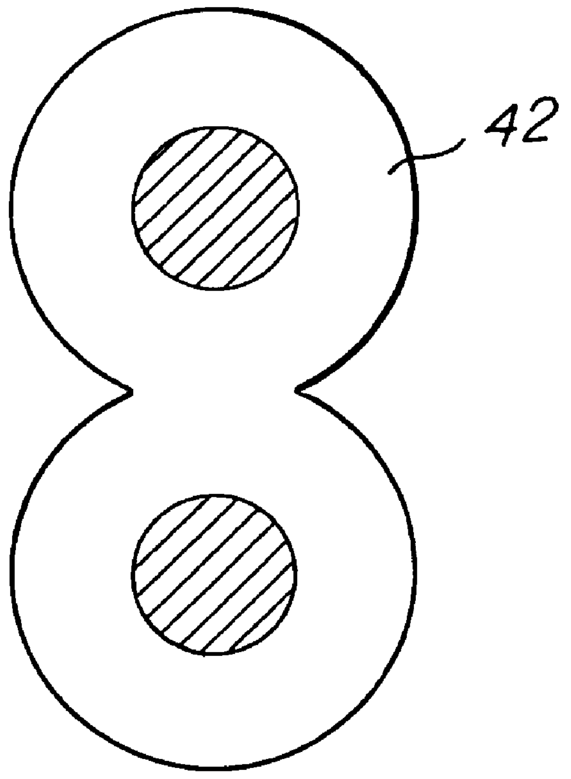
FIG. 5A is a schematic of the resulting bead element after the first portion of the actuation cycle.

Referring to FIG. 5, the first portion of the actuating cycle is shown. The lever arm portion 20 of the actuator handle 14 and the base handle 12 are squeezed by the user. As the actuator handle 14 pivots with respect to the base handle 12, the cam portion 18 causes the pincer members 22 and 24 to pivot. As the pincer members 22 and 24 pivot, they exert a lateral force about the equator or midpoint of the bead element 42. Preferably, the cam 18 and the lever arm 20 are configured in a way such that when base handle 12 and actuator handle 14 are squeezed together by a user, cam 18 initiates and completed the lateral compressive portion of the cycle to form a bead element with a substantially figure eight shape, such as shown in FIG. 5A.

In this preferred embodiment, the pair of pincers 22 and 24 exert opposite forces on the sides of the bead element 42. It should be understood that only one movable pincer member may be utilized by providing a stationary anvil opposite the pincer. Such an arrangement may result in a different shape than described above as desired by the user. The present invention may also include interchangeable pincer members to create different shapes as desired by the user by including detachable pivot fasteners as is known in the art.

Figure 6:
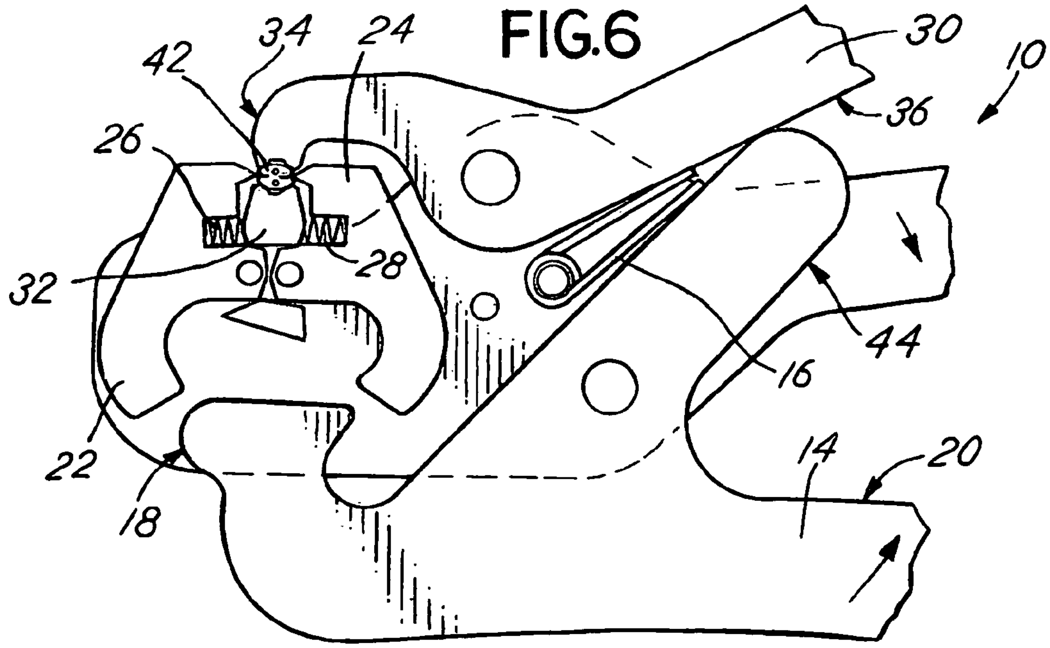
FIG. 6 is an enlarged view of the preferred embodiment of the present invention during a second portion of the actuation cycle.
Figure 6A:
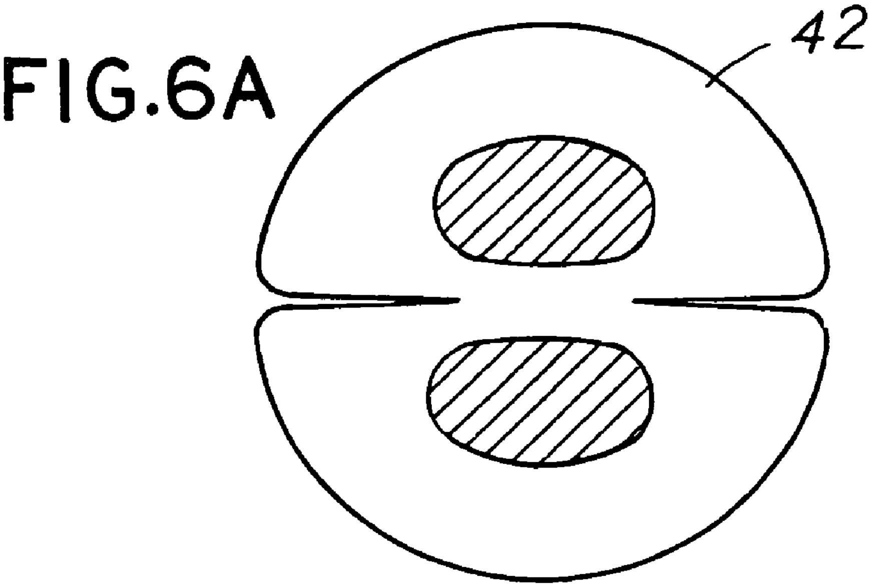
FIG. 6A is a schematic of the resulting bead element after the second portion of the actuation cycle.
Figure 7:
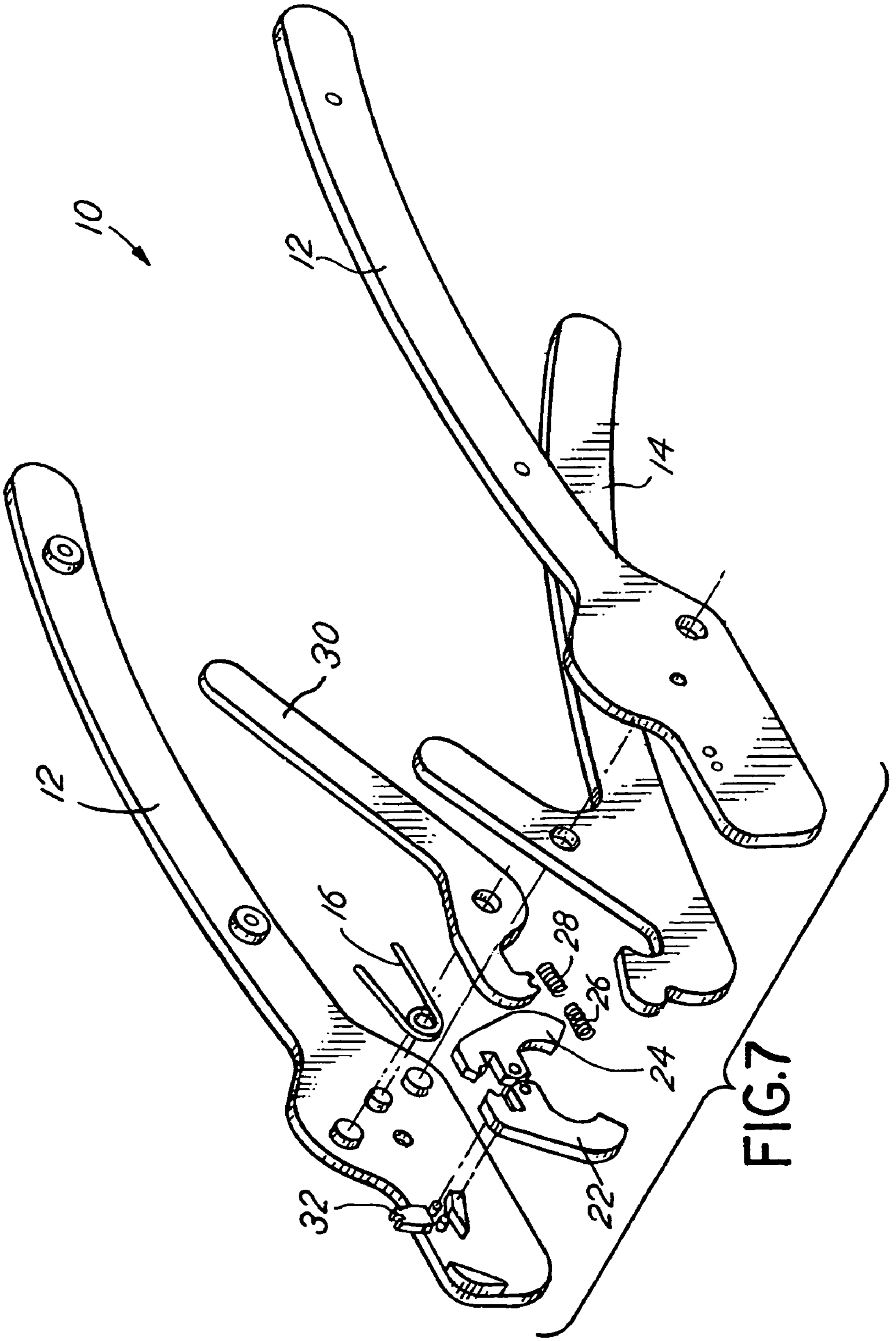
FIG. 7 is an exploded view of the preferred embodiment of the present invention.

Referring to FIG. 6, as the actuator handle 14 continues to be squeezed by the user, a second lever arm portion 44 of the actuator handle 14 contacts the tail portion 35 of the crush arm 30. The second lever arm portion 44 communicates a portion of the force exerted by the user on the actuator handle 14 to the crush arm 30. As the crush arm 30 pivots (in a counterclockwise direction in FIG. 6), the head portion 34 exerts a longitudinal force on the substantially figure eight shaped bead element. In this way, a bead can be crimped in two directions without the need for rotating or repositioning the bead. In addition, the crimping operation is simplified in that it is fully accomplished by a one squeeze of the handles by a user. As a result of this second portion of the actuating cycle, the bead element is shaped as shown in FIG. 6A. A bead wire is securely held within the crimped bead element. As a result of the particular two part crimping action, which is conducted without need for removal or repositioning of the bead element during the actuating cycle, the bead element contacts and holds the bead wire about substantially all of the bead wire circumference. FIG. 7 shows the various parts of the crimper tool 10 in an exploded view.

The crimper tool 10 is preferably made of materials durable enough for repeated duty cycles. Given the forces exerted, the crushing surfaces on pincers 22 and 24, crush plate 32, and crush arm 30 should be made of materials of sufficient durability and hardness to exert compressive forces on the object to be crimped. While design of the crimper tool can achieve certain mechanical advantages, it is estimated that the force exerted by the pincers 22 and 24 to pinch a 2 mm bead tube needed is between 15 and 40 pound-force. Similarly, the force required to crush the pinched bead between crush arm 30 and crush plate 32 is estimated at between 50 and 120 pounds. It should be understood that these are only one example and that beads of varying thicknesses and material construction may require less force or more force. It is also preferable that the materials used in the crimper tool are sufficiently robust to withstand the force that could be applied by a user trying to crimp a bead of larger thickness or geometry than the tool is designed for.

Release of the base handle 12 and actuator handle 14 by the user resets the tool 10 and opens the pair of pincers 22 and 24 and the interaction between crush arm 30 and crush plate 32. This permits extrication of the now crimped bead. Resetting of the tool 10 is assisted by a spring force of spring 16.

While the various descriptions of the present invention are described above, it should be understood that the various features can be used singly or in combination thereof. Therefore, this invention is not to be limited to the specific preferred embodiments depicted herein. Further, it should be understood that variations and modifications within the spirit and scope of the invention may occur to those skilled in the art to which the invention pertains. Accordingly, all expedient modifications readily attainable by one versed in the art from the disclosure set forth herein that are within the scope and spirit of the present invention are to be included as further embodiments of the present invention.

I claim:

1. A bead crimping tool suitable for crimping a bead element, the tool comprising:

a base handle comprising a crush plate member adapted to seat the bead element;

a pair of opposed pincer members positioned on opposite sides of the crush plate member, at least one of the pincer members pivotally mounted to the base handle;

an actuator handle member pivotally mounted to the base handle, the actuator handle member comprising a cam portion engageable with the at least one pivotally mounted pincer member, an actuator portion, and a lever arm portion;

a crush arm member pivotally mounted to the base handle, the crush arm member comprising a head portion and a tail portion engageable with the lever arm portion of the actuator handle, the crush arm member biased to cause the head portion to exert a holding force on the bead element seated on the crush plate member; and the actuator handle adapted to first cause the cam portion of the actuator handle to pivot the at least one pivotally mounted pincer member during actuation of the actuator handle so as to impart a lateral compressive force to a lateral portion of the bead element, the lateral compressive force being sufficient to collapse the bead element in a lateral direction, and the actuator handle adapted then to cause the lever arm portion to engage the tail portion and urge the head portion of the crush arm to impart a longitudinal compressive force about a top portion of the bead element, the longitudinal compressive force sufficient to compress the collapsed bead element in a longitudinal direction.

2. The tool of claim 1, wherein each of the pair of opposed pincer members are pivotally mounted to the base handle such that actuation of the actuator handle causes each of the pincer members to impart a lateral compressive force to the lateral portion of the bead element, the lateral compressive force by each respective pincer member being in an opposite direction to the lateral compressive force of the opposed pincer member.

3. The tool of claim 1, wherein the crush plate member defines a substantially concave recess for seating the bead element, and the head portion of the crush arm defines an substantially concave recess that is opposite facing to the crush plate concave recess.

4. The tool of claim 1, wherein the pair of pincer members are biased to pivot away from one another.

5. The tool of claim 1, wherein the crush arm member being biased by a spring member.

6. The tool of claim 5, wherein the spring member is adapted to reset the tool to a starting position after crimping a bead element.

7. A method of crimping a bead element with a hand held tool, the method comprising:

placing the bead element on a seat of a crush plate member, the crush plate member being connected to a base handle;

causing a crush arm member pivotally mounted to the base handle to hold the bead element on the seat;

conducting an actuating cycle, wherein the actuating cycle comprises causing a single continuous movement to pivot an actuator handle member mounted to the base handle and engageable with the at least one pivotally mounted pincer member and the crush arm over a first portion of the actuating cycle and a second portion of the actuating cycle, wherein during the first portion of the actuating cycle, at least one of a pair of opposed pincer members positioned on opposite sides of the crush plate member is caused to pivot the at least one pivotally mounted pincer member so as to impart a lateral compressive force to a lateral portion of the bead element, the lateral compressive force being sufficient to collapse the bead element in a lateral direction, and during a second portion of the actuating cycle the actuator handle causes the crush arm to impart a longitudinal compressive force about a top portion of the bead element, the longitudinal compressive force sufficient to compress the collapsed bead element in a longitudinal direction; and removing the bead element from the hand held tool.

8. The method of claim 7, wherein actuating the actuator handle comprises causes each of the pair of opposed pincer members to impart a lateral compressive force to the lateral portion of the bead element, the lateral compressive force by each respective pincer member being in an opposite direction to the opposed pincer member.

9. The method of claim 7, wherein actuating the actuator handle member causes the bead element to be formed with a substantially figure eight shaped cross section.

10. A hand actuated bead crimping tool, the tool comprising:

a base handle;

a crush plate operatively connected to the base handle and adapted to seat a bead element to be crimped;

at least one movable pincer member positioned adjacent the crush plate member, the at least one pincer members operatively connected to the base handle and movable relative to the crush plate;

an actuator handle member operatively connected to the base handle, the actuator handle member adapted to cause movement of the pincer member relative to the crush plate;

a crush arm member operatively connected to the base handle, adapted to exert a holding force on the bead element seated on the crush plate; and the actuator handle adapted to first cause the at least one pincer member during actuation to impart a lateral compressive force to a lateral portion of the bead element, the lateral compressive force being sufficient to collapse the bead element in a lateral direction, and the actuator handle adapted then to urge the crush arm to impart a longitudinal compressive force about a top portion of the bead element, the longitudinal compressive force sufficient to compress the collapsed bead element in a longitudinal direction.

11. The bead crimping tool of claim 10, wherein the crush plate is integral with the base handle and defines a substantially concave seat to seat the bead element to be crimped.

12. The bead crimping tool of claim 10, wherein the actuator handle member is pivotally mounted to the base handle and comprises, a cam portion engageable with the at least one pivotally mounted pincer member, an actuator portion, and a lever arm portion, and wherein the crush arm member is pivotally mounted to the base handle and includes a head portion and a tail portion engageable with the lever arm portion of the actuator handle, the crush arm member further being biased by a spring member to exert the holding force.

13. The bead crimping tool of claim 12 wherein an actuation cycle of the actuator handle includes at least a first part and a second part:

the first part of the actuation cycle including causing the cam portion of the actuator handle to pivot the at least one pivotally mounted pincer member so as to impart a lateral compressive force to a lateral portion of the bead element, the lateral compressive force being sufficient to collapse the bead element in a lateral direction; and the second part of the actuation cycle causes the lever arm portion to engage the tail portion and urge the head portion of the crush arm to impart a longitudinal compressive force about a top portion of the bead element, the longitudinal compressive force sufficient to compress the collapsed bead element in a longitudinal direction.

14. The bead crimping tool of claim 10, wherein each of the pair of opposed pincer members are pivotally mounted to the base handle such that actuation of the actuator handle causes each of the pincer members to impart a lateral compressive force to the lateral portion of the bead element, the lateral compressive force by each respective pincer member being in an opposite direction to the lateral compressive force of the opposed pincer member.

* * * * *